UNITED STATES PATENT OFFICE.

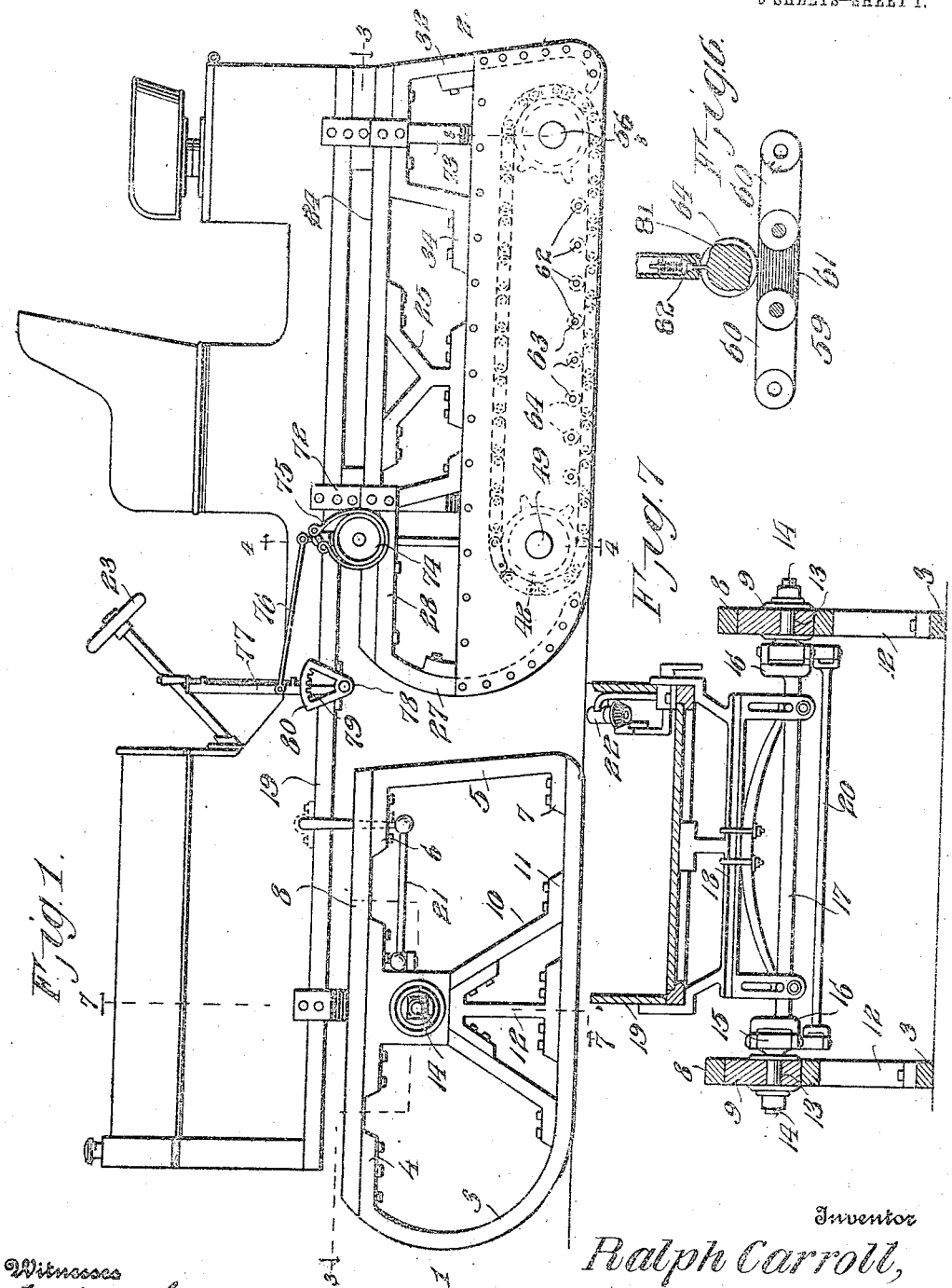

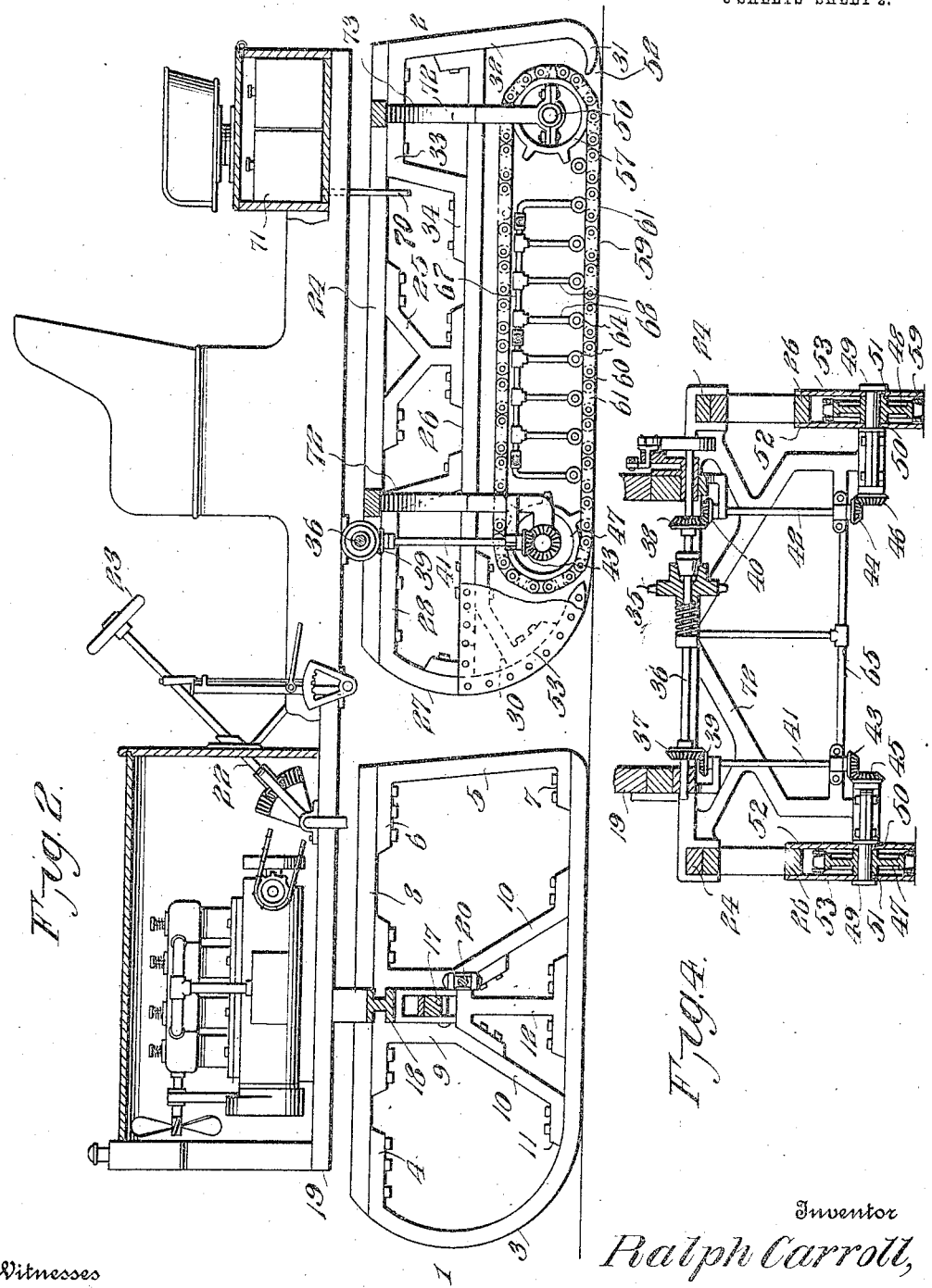

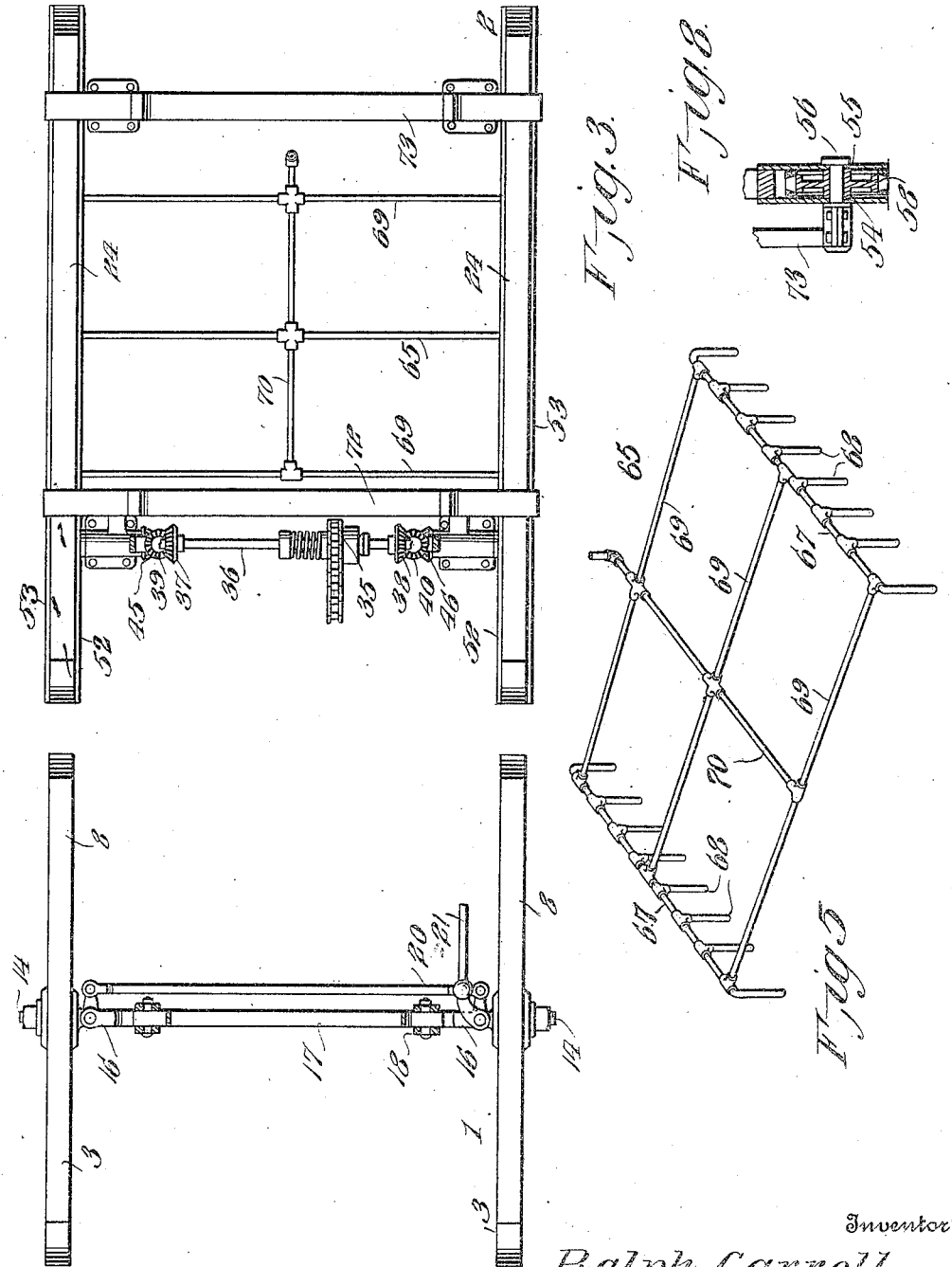

RALPH CARROLL, OF SIMMONSVILLE, RHODE ISLAND.

AUTOMOBILE SLED.

1,045,771.  Specification of Letters Patent.  Patented Nov. 26, 1912.

Application filed January 21, 1911. Serial No. 603,889.

*To all whom it may concern:*

Be it known that I, RALPH CARROLL, a citizen of the United States, residing at Simmonsville, in the county of Providence and State of Rhode Island, have invented new and useful Improvements in Automobile Sleds, of which the following is a specification.

This invention relates to improvements in power driven sleds, the primary object of the invention being to provide a device of this character with simple and effective means whereby the propelling means for the sled are at all times retained in contact with the ice or snow over which the vehicle travels.

Another object of the invention is to provide simple and effective means whereby the operating or propelling elements are adapted to travel under a plurality of anti-frictional rollers, the said rollers not only sustaining the propelling means in contact with the surface over which the vehicle travels, but also greatly reducing the friction of the same, thereby requiring but a minimum amount of power for propelling the vehicle.

A still further object of the invention is the provision of means whereby a lubricant may be fed to the anti-frictional rollers.

With the above and other objects in view which will be more apparent as the description progresses, the invention resides in the novel construction and combination of parts hereinafter fully described and claimed.

In the accompanying drawings, Figure 1 is a side elevation of an automobile sled constructed in accordance with the present invention. Fig. 2 is a similar view, the cover or shield of the propelling chain being removed. Fig. 3 is a horizontal sectional view upon the line 3—3 of Fig. 1. Fig. 4 is a transverse sectional view upon the line 4—4 of Fig. 1. Fig. 5 is a detail view of the combined brace and lubricant. Fig. 6 is a detail sectional view of the elements employed in constructing the endless chain or conveyer. Fig. 7 is a transverse sectional view upon the line 7—7 of Fig. 1. Fig. 8 is a sectional view upon the line 8—8 of Fig. 1.

In the accompanying drawings, the numerals 1 designate the front or steering runners of the sled and 2 the rear or propelling runners therefor. The front runners comprise the guiding or steering runner designated by the numeral 3 which has its front portion curved and its lower portion horizontally straight as clearly shown in Fig. 1 of the drawings. The upper portion of the curved front of each of the runners is bent inwardly as at 4, while the rear portion of each of the runners is provided with a substantially vertical member 5 having both of its ends offset at substantially right angles to the body thereof as designated by the numerals 6 and 7. The lower offset member 7 is connected with the lower runner member through the medium of suitable retaining elements, such as bolts or the like. The numeral 8 designates the connecting member for the front runner. This member is secured to the offset 4 as well as to the offset 6 in any desired or preferred manner. The numeral 9 designates the central brace for the runner. This brace member 9 is secured to the member 8 and has its lower portion formed with oppositely arranged angular arms 10, the lower extremities of which being offset as at 11, and being secured to the horizontal portion of the runner 3. The runner is further reinforced through the medium of a central member 12, the latter having its upper extremity formed with angular arms engaging the angular arms 10 of the member 9 and the lower extremity of the said member 12 is offset in opposite directions and secured to the runner 3.

The member 9 is centrally provided with a suitable opening 13, the latter being adapted for the reception of the short axle 14 provided upon a knuckle joint 15. The knuckle joint is of the usual construction employed in automobiles and the said joint is adapted to fit between the spaced arms 16 provided upon the substantially U-shaped extension of the axle proper 17. The axle is provided with a suitable spring support 18 to which the body 19 of the vehicle is attached. The offset arm of the knuckle joint 15 is adapted to engage with a sliding rod 20, and the said rod is connected through the medium of a ball joint with a second rod 21, and this second rod is attached in any desired manner with a post 22 of the steering wheel 23. It is, of course, to be understood that both of the front runners 1 are constructed in a similar manner and that the numerals referring to the parts of one of the runners are to be taken as applicable to the second runner.

The frames of the rear runners 2 comprise essentially a longitudinally extending bar 24, and each of these bars is preferably arranged directly below and in a line with the sides of the body 19. Centrally connected with each of the said bars is a Y-shaped member 25. The lower extremity of this member is secured to a second longitudinally extending bar 26.

The numeral 27 designates the front member of each of the rear runners. This member has its outer portion rounded but is arranged a suitable distance above the plane of the horizontal members of each of the front runners 1. The upper extremity of this member is bent inwardly as at 28 and is secured to the top bar 24 in any desired or preferred manner. The member 28 has its rear portion integrally formed with an L-shaped knee and the lower or offset portion of the said knee is secured to the bar 26. The lower portion of the rounded member 27 is also connected to the under face of the bar 26 through the medium of a suitable brace member 30.

The rear member of the frame for each of the runners 2 has its lower extremity slightly inclined toward the member 27 as designated by the numeral 31. This curved extension 31 is also positioned a distance above the plane of the horizontal members of the runners 1, and the straightened portion 32 of the rear member has its upper extremity bent inwardly in a substantially horizontal plane, as indicated by the numeral 33, and this member is connected with the bar 24 in any desired manner. The inner extremity of the portion 33 is bent downwardly and has its extremity formed with a horizontal offset 34 which is secured to the upper face of the bar 26.

The engine for the device is preferably arranged at the front and above the forward runners 1, and the said engine is connected through the medium of a sprocket with a suitable sprocket wheel 35 which is arranged upon a transverse shaft 36. The shaft 36 has its opposite ends provided with beveled toothed wheels 37 and 38, and these toothed wheels are adapted to mesh with similar beveled toothed wheels 39 and 40 provided upon vertical shafts 41 and 42. The lower extremities of the shafts 41 and 42 are also provided with beveled toothed wheels 43 and 44 and these toothed wheels are adapted to mesh with smaller toothed wheels 45 and 46 which are preferably integrally formed upon sprocket wheels 47 and 48. The shafts 36, 41 and 42 are mounted in suitable bearings and the sprocket wheels 47 and 48 are adapted for the reception of suitable axles 49, the same bearing within suitable openings 50 and 51 provided upon the removable sides 52 and 53. These sides 52 and 53 are adapted to be secured to the bar 26 and the lower _ions of the members 27 and 31. The sides 52 and 53 have their rear portions formed with bearing openings 54 and 55, the said openings 54 and 55, adapted to receive a suitable axle 56, with which is connected the rear sprocket wheels 57 and 58. These sprocket wheels 57 and 58 are of a size substantially equaling the sprocket wheels 47 and 48, and the said sprockets are adapted for the reception of an endless chain or propeller 59. The chain or propeller comprises a solid block 60 which is adapted for pivotal connection adjacent its opposite ends with links 61.

The sides 52 and 53 are provided with a plurality of openings 62, and these openings are adapted to serve as bearings for shafts 63 provided upon steel anti-frictional wheels 64. The wheels 64 are adapted to contact the upper faces of the lower leads of the endless chain 59 so that the said chain is at all times sustained in contact with the surface over which the vehicle is adapted to travel.

Secured to the rear runners 2 in any desired manner is what I term a combined reinforcing member and lubricator. This member comprises a pair of spaced longitudinally extending pipe sections 67. Each of these pipe sections has opposite ends closed and their under faces provided with a plurality of outlet spouts 68. Each of the spouts 68 is adapted to be positioned above each of the anti-frictional rollers 64 and the pipes 67 are connected together through the medium of transversely arranged pipes 69. Each of the transversely arranged pipes 69 is provided with an inlet pipe 70 and which is connected with a lubricant supply tank 71 which is arranged in any desired position above the said member 65. The side pipes of the member 65 are adapted to be secured in any desired manner to the opposite rear runners 2, the same serving as an additional reinforcing member for the runners. The axles for the rear sprocket wheels are supported through the medium of suitable transversely arranged brace members 72 and 73, these members being also connected with the frames of the rear runners 2 and adapted to serve as a support for the body 19.

The shaft 36 is provided with a brake wheel 74 and this wheel is adapted to be engaged by a band brake 75. This brake is connected, through the medium of a suitable rod 76, with a lever 77. This lever is provided with a spring-pressed pawl 78 and the pawl is adapted to coact with teeth 79 formed upon a segment 80. The lever is positioned within easy access of the operator and from the above description taken in connection with the accompanying drawings, it will be noted that I have provided a strong and effective device for the purpose intended and while I have illustrated and described the preferred embodiment thereof as it appears to me, minor details of construction within the scope of the appended claims may be made if desired.

By reference to Fig. 6 of the drawings, it will be noticed that the wheels 64 have one of their faces provided with oppositely arranged offsets forming cams 81 and that a spring actuated valve 82, which is arranged within and which normally closes each of the outlet spouts, has its extending stem normally contacting the said inner face of each roller 64, so that the said stems will contact with the enlargements or cams 81 and the said valves will be opened, it being understood, of course, that the rollers 64 are revolved through the medium of the endless chain or propeller 59 with which they contact.

Having thus fully described the invention, what I claim as new, is:—

1. In a device for the purpose set forth, including front and rear runners, the frame of the rear runners having sides, said sides adapted to provide bearings for transversely arranged axles, sprocket wheels upon said axles, an endless chain conveyer for each pair of sprocket wheels, anti-frictional means for retaining the lower flight of each of the chains below the edges of the sides, two of said sprocket wheels being formed with beveled toothed wheels, vertical shafts, beveled toothed wheels upon both the upper and lower ends of each of the shafts, the beveled toothed wheels upon the lower end of the shafts adapted to mesh with the beveled toothed wheels of the sprocket wheels, a transverse shaft having its ends provided with toothed beveled wheels engaging the toothed beveled wheels of the vertical shafts, and means for imparting motion to the transverse shaft.

2. In a device for the purpose set forth, including a body, front and rear runners, steering means and propelling means, of an endless chain propeller for each of the rear runners, said propellers each comprising a plurality of slide blocks having their ends connected with links, anti-frictional rollers engaging with the upper faces of the lower leads of the said propellers, a frame constructed of pipe sections secured above the propellers, the longitudinal pipe sections of the said frame having a plurality of nozzles arranged directly above the propellers, each of said nozzles being provided with a spring actuated valve, and the anti-frictional rollers having off-sets adapted to contact with the said valves.

In testimony whereof I affix my signature in presence of two witnesses.

RALPH CARROLL.

Witnesses:
JAMES W. McDOLE,
EVA L. PIKE.